United States Patent [19]

Hidaka et al.

[11] Patent Number: 5,420,745

[45] Date of Patent: May 30, 1995

[54] SURFACE-MOUNT TYPE CERAMIC CAPACITOR

[75] Inventors: Akio Hidaka; Jirou Oota; Katsumi Sasaki; Hiromitsu Taki; Noriya Satou, all of Miyazaki, Japan

[73] Assignee: Matsushita Electric Industrial Co., Ltd., Osaka, Japan

[21] Appl. No.: 242,062

[22] Filed: May 13, 1994

Related U.S. Application Data

[63] Continuation of Ser. No. 953,957, Sep. 29, 1992, abandoned.

[30] Foreign Application Priority Data

Sep. 30, 1991 [JP] Japan ................................. 3-250856
Nov. 8, 1991 [JP] Japan ................................. 3-292781

[51] Int. Cl.$^6$ ......................... H01G 1/14; H01G 4/00
[52] U.S. Cl. ............................... 361/306.1; 361/301.3
[58] Field of Search ............... 361/303, 306.2, 306.1, 361/306.3, 405, 321.1, 321.6, 539, 540, 368.11, 301.3; 338/324; 174/52.2; 29/856

[56] References Cited

U.S. PATENT DOCUMENTS

| | | | |
|---|---|---|---|
| 4,510,554 | 4/1985 | Irikura | 361/433 |
| 4,578,737 | 3/1986 | Westerman | 361/308 |
| 4,933,811 | 6/1990 | Dorlanne | 361/405 |
| 4,959,505 | 9/1990 | Ott | 361/405 |
| 5,057,973 | 10/1991 | Governelle et al. | 361/534 |

FOREIGN PATENT DOCUMENTS 0089501 4/1989 Japan ................................. 174/52.2

Primary Examiner—Bruce A. Reynolds
Assistant Examiner—Michael D. Switzer
Attorney, Agent, or Firm—Pollock, Vande Sande & Priddy

[57] ABSTRACT

A surface-mount type ceramic capacitor particularly suitable for use in an intermediate to high tension circuit is disclosed, wherein lead terminals are spaced from a dielectric ceramic substrate except for a portion joined with electrodes. With this spaced arrangement, the ceramic capacitor has a high electric breakdown strength and an improved heat-resisting property and, hence, is capable of operating reliably over a long period of use.

18 Claims, 2 Drawing Sheets

SURFACE-MOUNT TYPE CERAMIC CAPACITOR

This application is a continuation of U.S. patent application Ser. No. 07/953,957, filed Sep. 29, 1992 now abandoned.

BACKGROUND OF THE INVENTION

1. Field of the Invention

The present invention relates to a ceramic capacitor of a surface-mount type, which is particularly suitable for use in a medium to high tension circuit, such as a horizontal resonance circuit, an AC noise suppression circuit or a rectifier circuit, of a general electronic device or a power supply.

2. Description of the Related Art

In recent years, with the progress of downsizing of electronic circuits used in an electronic device or a power supply, a demand for a ceramic capacitor of a type which can be assembled by the surface-mount technology on an electronic circuit has increased because many ceramic capacitors are used in the electronic circuit. The ceramic capacitor of this type is hereinafter referred to as "surface-mount type ceramic capacitor".

An example of conventional surface-mount type ceramic capacitors will be described with reference to FIG. 5 of the accompanying drawings.

As shown in FIG. 5, the conventional surface-mount type ceramic capacitor includes a dielectric ceramic substrate 1 made of a dielectric material such as ceramic, a pair of electrodes 2 made of a conductive metal such as silver and disposed on upper and lower surfaces of the dielectric ceramic substrate 1, a pair of lead terminals 3 connected to the electrodes 2, respectively, by means of a solder or a conductive adhesive, and a cover member 4 made from an insulating synthetic resin (hereinafter referred to as "insulating resin") and containing the dielectric ceramic substrate 1, electrodes 2 and an inner part of each lead terminal 3. Each of the lead terminals 3 has an intermediate bent over a side surface 1a of the dielectric ceramic substrate 1, and a generally hook-shaped external terminal portion 3a extending laterally outwardly from a front end of the intermediate portion to the outside of the cover member 4 and bent over an outer surface of the cover member 4. More specifically, the external terminal portion 3a extends from one of opposite side surfaces 4a to a bottom surface 3a of the cover member 4.

With this construction, however, since the lead terminals 3 are held in direct contact with the side surface 1a of the dielectric ceramic substrate 1, it occurs likely that when the ceramic capacitor is used in a high tension circuit, a spark or a short takes place between the lead terminals 3 and the dielectric ceramic substrate 1 due to electric lines of force concentrated on the lead terminals 3. In addition, since contact surfaces between the lead terminals 3 and the dielectric ceramic substrate 1 are not filled with the material (insulating resin) of the cover member 4, when the ceramic capacitor is subjected to a high temperature, the cover member 4 tends to crack due to the difference in the thermal expansion coefficient between the dielectric ceramic substrate 1 and the cover member 4. Furthermore, residual gases when existing between the dielectric ceramic substrate 1 and the lead terminals 3 will exert negative effects on the results of a heat cycle test and the heat-resisting property of the ceramic capacitor.

SUMMARY OF THE INVENTION

With the foregoing drawbacks of the prior art in view, it is an object of the present invention to provide a surface-mount type ceramic capacitor which is able to operate reliably without causing a failure such as a spark or a short even when it is used in a high tension circuit, and which has an improved heat-resisting property capable of withstanding a severe heat cycle test.

A surface-mount type ceramic capacitor of this invention comprises a dielectric ceramic substrate, a pair of electrodes disposed on opposite surfaces of the dielectric ceramic substrate, a pair of lead terminals connected to the electrodes, respectively, and a cover member covering at least the dielectric ceramic substrate. Each of the lead terminals has a first portion joined with a corresponding one of the electrodes, and a second portion excluding the first portion. The second portion is spaced from the dielectric ceramic substrate with an insulating member disposed between the second portion and the dielectric ceramic substrate.

The cover member and the insulating member may be made of a same insulating material. Preferably, the cover member is molded of an epoxy resin.

The cover member has a mounting surface used for mounting the ceramic capacitor on the surface of a printed circuit board, and the second portion of each lead terminal has a part extending parallel to the mounting surface. The dielectric ceramic substrate may be disposed either in parallel to, or at an angle to, the mounting plane. When the dielectric ceramic substrate is inclined relative to the mounting surface, there is provided a larger space between each lead terminal and the dielectric ceramic substrate, which space provides a high electric breakdown strength. The angle of inclination of the dielectric ceramic substrate relative to the mounting surface may be in the range of from 1 to 45 degrees and preferably in the range of from 5 to 20 degrees.

The above and other objects, features and advantages of the present invention will become more apparent from the following description when making reference to the detailed description and the accompanying sheets of drawings in which preferred structural embodiments incorporating the principles of the present invention are shown by way of illustrative examples.

DETAILED DESCRIPTION OF THE PREFERRED EMBODIMENTS

Figure 1:
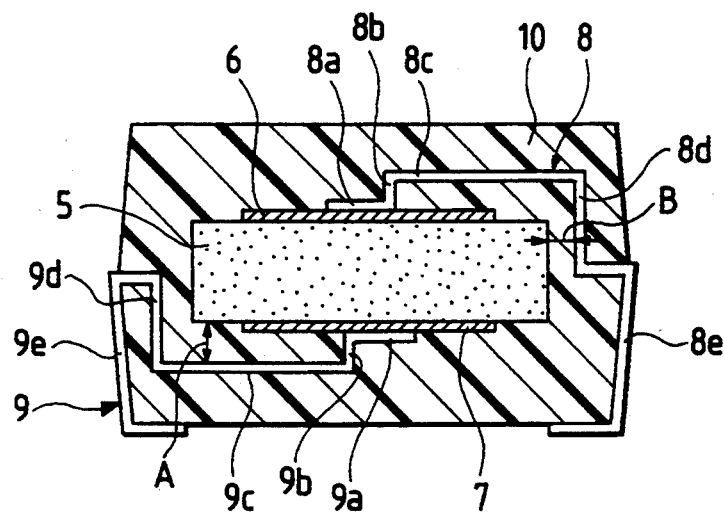
FIG. 1 is a cross-sectional view of a surface-mount type ceramic capacitor according to an embodiment of the present invention.

The present invention will be described in greater detail with reference to certain preferred embodiments shown in the accompanying drawings in which like reference characters designate like or corresponding parts throughout the several views.

FIG. 1 shows in cross section a surface-mount type ceramic capacitor according to an embodiment of the present invention. The ceramic capacitor includes a dielectric ceramic substrate 5 made of a dielectric material such as ceramic, a pair of electrodes 6 and 7 formed respectively on upper and lower surfaces of the dielectric ceramic substrate 5, two lead terminals 8 and 9 connected by a solder or a conductive adhesive to the respective electrodes 6 and 7, and a cover member 10 molded of an insulating resin such as epoxy resin and covering all of the dielectric ceramic substrate 1, electrodes 6 and 7 and lead terminals 8 and 9 except for those portions of the respective lead terminals 8 and 9 which are used for connection with external parts such as conductors on a printed circuit board (not shown).

The dielectric ceramic substrate 5 of the ceramic capacitor is prepared in a manner described below.

A basic raw material containing a main component composed of barium titanate and a sub-component composed of several additives such as calcium carbonate, silica, etc. is homogeneously mixed up and dried by using a general ceramic-making technique. The material is subsequently granulated using a suitable binder such as polyvinyl alcohol. The granulated material is press-formed at a pressure of about 1 ton/cm$^2$ into a circular plate or disk having a diameter of 6.0 mm and a thickness of 1.0 mm. The press-formed disk is baked in the air at a temperature ranging from 1300° to 1400° C., thus preparing a dielectric ceramic substrate of 5.0 mm in diameter and 0.8 mm in thickness. The materials and processes used for the preparation of the dielectric ceramic substrate 5 described above should be construed as being illustrative and not restrictive. Accordingly, it is possible to use a dielectric ceramic substrate made by using materials and processes other than specified above.

The electrodes 6 and 7 of the ceramic capacitor shown in FIG. 1 are formed in a manner described below.

An electrode paste having a circular form of 4.0 mm in diameter is printed on each of the upper and lower surfaces of the dielectric ceramic substrate 5. The electrode paste is a mixture of a main component composed of silver and a sub-component composed of copper, nickel, etc. The printed electrode pastes are baked in the air at 800° C. for 10 minutes, thus forming two electrodes 6 and 7 disposed on the upper and lower surfaces of the dielectric ceramic substrate 5. It is to be noted that other materials and processes may be used for preparing the electrodes 6 and 7.

The lead terminals 8 and 9 of the ceramic capacitor shown in FIG. 1 are formed in a manner described below. The lead terminals 8 and 9 are press-formed from an elongate strip made of a 42-alloy and having a thickness of 0.1 mm and a width of 2.5 mm. The lead terminal 8 includes a flat connecting portion 8a joined by a solder or a conductive adhesive to the electrode 6, a first vertical portion or step 8b bent up from an end of the connecting portion 8a, a horizontal portion 8c extending perpendicularly (rightward in FIG. 1) from an upper end of the step 8b and parallel spaced from the electrode 6 and the dielectric ceramic substrate 5. A second vertical portion 8d is bent down from a front end of the horizontal portion 8c and parallel spaced from a side surface of the dielectric ceramic substrate 5, and a generally hook-shaped external terminal portion 8e extends from a front end of the second vertical portion 8d and is substantially disposed outside a plane of the vertical portion 8d. Similarly, the lead terminal 9 includes a flat connecting portion 9a, a first vertical portion or step 9b, a horizontal portion 9c, a second vertical portion 9d and an external terminal portion 9e which are substantially the same in configuration as the corresponding portions 8a–8e of the lead terminal 8.

The cover member 10 of the ceramic capacitor is molded of an insulating resin such as epoxy resin and covers all of the components 5–10 of the ceramic capacitor except the terminal portions 8e and 9e of the respective lead terminals 8 and 9, as shown in FIG. 1.

With the ceramic capacitor thus constructed, since the lead terminals 8, 9 and the dielectric ceramic substrate 5 are separated from one another by the material (insulating resin) of the cover member 10 disposed therebetween, a spark or a short will never occur between the lead terminals 8, 9 and the dielectric ceramic substrate 5. In addition, when the ceramic capacitor is in a heated condition, a volumetric change may be caused due to the difference in thermal expansion coefficient between the lead terminals 8, 9 and the dielectric ceramic substrate 1. However, such volumetric change is taken up or absorbed by the material of the cover member 10 existing between the lead terminals 8, 9 and the dielectric ceramic substrate 5. Thus, the cover member 10 is prevented from cracking even when the ceramic capacitor is used in high-temperature conditions.

The spacing A, B between the lead terminals 8, 9 and the dielectric ceramic substrate 5 is preferably not smaller than 0.1 mm, so that the material of the cover member 10 is able to fill up the space between the lead terminals 8, 9 and the dielectric ceramic substrate 5, thereby bringing about the advantageous effects described above. The spacing A, B is determined in view of the flowability of the material (insulating resin) of the cover member 10 and the specification and intended use of the ceramic capacitor.

The surface-mount type ceramic capacitor of the foregoing construction is made in a manner described below.

Figure 2:
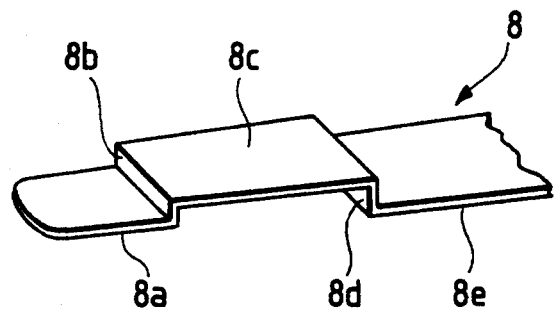
FIG. 2 is a perspective view of a portion of a lead terminal of the surface-mount type ceramic capacitor.
Figure 3:
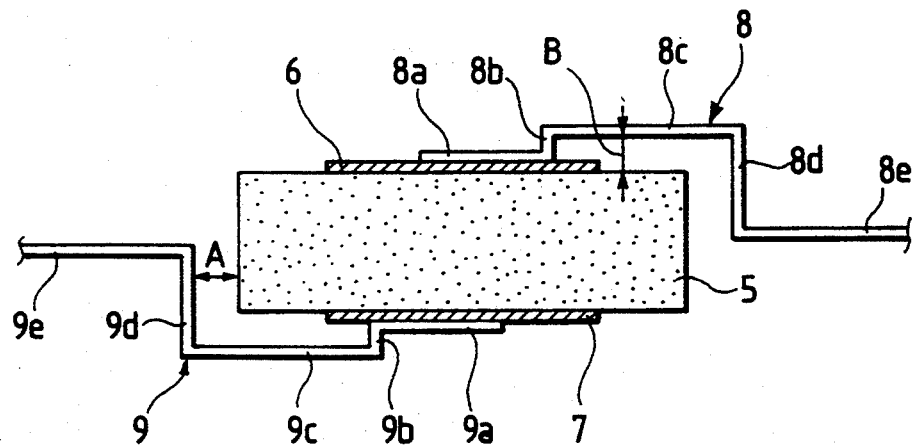
FIG. 3 is an enlarged cross-sectional view showing a portion of the surface-mount type ceramic capacitor.

Firstly, a lead terminal 8 is produced by press-forming an elongate strip of 42-alloy into a particular shape having a connecting portion 8a, a first vertical portion or step 8b, a horizontal portion 8c, a second vertical portion 8d and an external terminal portion 8e, such as shown in FIG. 2. Then, a lead terminal 9 is formed in the same manner as the lead terminal 8. The lead terminal 9 thus formed has a connecting portion 9a, a first vertical portion or step 9b, a horizontal portion 9c, a second vertical portion 9d and an external terminal portion 9e. At this stage, the external terminal portions 8e, 9e of the lead terminals 8, 9 are straight and not bent into a generally hook shape. Subsequently, two electrodes 6 and 7 are formed by printing on opposite surfaces (upper and lower surfaces) of the dielectric ceramic substrate 5. Thereafter, the respective connecting portions 8a, 9a of the lead terminals 8, 9 are joined by a solder or a conductive adhesive to the electrodes 6, 7, thereby joining the lead terminals 8, 9 and the electrodes 6, 7, as shown in FIG. 3. In this instance, if the conductive adhesive is used, the dielectric ceramic substrate 5 and the lead terminals 8, 9 attached thereto are heated at 150° C. for 30 minutes so as to cure the conductive adhesive. The dielectric ceramic substrate 5 having the lead terminals 8, 9 is then set in a mold of a transfer molding machine. The mold is preheated at around 170° C. An epoxy resin in the form of a tablet having a diameter of 30 mm and a thickness of 15 mm is forced by a plunger of the transfer molding machine into the preheated mold at a pressure of 100 kg/cm² for 120 seconds, thus forming a molded insulating cover member 10 which covers the dielectric ceramic substrate 5, the electrodes 6, 7 and the part of the lead terminals 8, 9 such as shown in FIG. 1. The cover member 10 thus molded has a substantially rectangular shape having a length of 9 mm, a width of 8 mm and a height of 4 mm. Then, the external terminal portions 8e, 9e of the respective lead terminals 8, 9 are bent into a hook shape so as to extend over and around the side and the bottom of the cover member 10. Thus, a surface-mount type ceramic capacitor shown in FIG. 1 is produced.

Electric and thermal properties of a surface-mount type ceramic capacitor according to the embodiment of this invention will be described below in comparison with those of a conventional surface-mount type ceramic capacitor.

Figure 5:
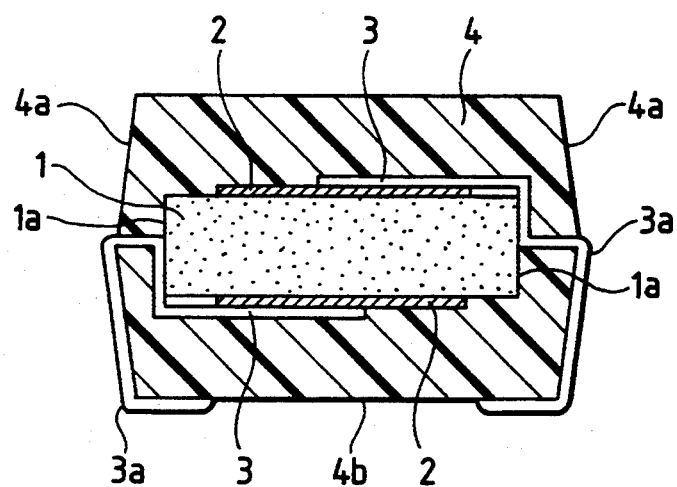
FIG. 5 is a cross-sectional view of a conventional surface-mount type ceramic capacitor.

The surface-mount type ceramic capacitor of this invention is represented by the ceramic capacitor shown in FIG. 1, while the conventional surface-mount type ceramic capacitor is represented by the ceramic capacitor shown in FIG. 5. In this instance, the inventive ceramic capacitor and the conventional ceramic capacitor are the same in the material and size of the dielectric ceramic substrate, the material and size of the cover member, and the material of the lead terminals.

Using 10 samples for each of the inventive ceramic capacitor and the conventional ceramic capacitor, an electric breakdown voltage test and a heat cycle test were performed.

In the electric breakdown voltage test, an AC voltage was applied across the lead terminals of each sample ceramic capacitor. The AC voltage was gradually increased from 0 V, and when an electric breakdown occurs in the sample ceramic capacitor, the voltage value applied at that time was recorded as an AC breakdown voltage. The average AC breakdown voltage of the 10 samples was calculated for each of the inventive ceramic capacitor (Invention) and the conventional ceramic capacitor (Prior Art). Results of the electric breakdown voltage test are shown in Table 1.

TABLE 1

|  | AC Breakdown Voltage [kVAC] |
| --- | --- |
| Prior Art | 4.0 |
| Invention | 6.2 |

As appears clear from Table 1, the inventive ceramic capacitor has an AC breakdown voltage which is about 1.5 times as large as that of the conventional ceramic capacitor. This is because, in the case of the conventional ceramic capacitor shown in FIG. 5, the dielectric ceramic substrate 1 and the lead terminals 3 are held in direct contact with each other without intervention of the material (insulating resin) of the cover member 4 so that when an AC voltage is applied across the lead terminals 3, a breakdown occurs at a relatively low voltage due to a spark produced between the dielectric ceramic substrate 1 and the lead terminals 3. Conversely, according to the inventive ceramic capacitor shown in FIG. 1, the lead terminals 8, 9 and the dielectric ceramic substrate 5 are separated from one another by the material (insulating resin) of the cover member 10 disposed therebetween. With this spaced arrangement, a spark does not take place between the dielectric ceramic substrate 5 and the lead terminals 8, 9. Thus, the inventive ceramic capacitor has a higher AC breakdown strength than the conventional ceramic capacitor.

The heat cycle test was performed in a well-known manner at temperatures ranging from −40° to +120° C. Each sample ceramic capacitor was first held at −40° C. for 30 minutes and then the test temperature was changed with an increment of 10° C. At each of the test temperatures, the sample ceramic capacitor was held for 30 minutes. One cycle of heat tests thus performed through the temperature range of −40°−+120° C. was repeated until the dielectric ceramic substrate or the cover member of the sample ceramic capacitor cracked. The number of repetitions of the heat cycle test (maximum heat cycle) is shown in Table 2.

TABLE 2

|  | Maximum Heat Cycle |
| --- | --- |
| Prior Art | 560 |
| Invention | 1100 |

As evidenced from Table 2, the number of repetitions of the heat cycle test of the inventive ceramic capacitor is about two times as great as that of the conventional ceramic capacitor. This is because the material of the cover member 10 disposed between the lead terminals 8, 9 and the dielectric ceramic substrate 5 takes up or absorbs a volumetric change caused due to the difference in the thermal expansion coefficient between the lead terminals 8, 9 and the dielectric ceramic substrate 5, so that the ceramic capacitor is prevented from cracking.

As described above, the surface-mount type ceramic capacitor of this invention is superior in electric and thermal properties to the conventional ceramic capacitor.

A second embodiment of the present invention will be described below in conjunction with the difference from the first embodiment described above.

When a further downsizing of the surface-mount type ceramic capacitor shown in FIG. 1 is necessary, it becomes difficult to fill the space between the lead terminals 8, 9 and the dielectric ceramic substrate 5 with the material of the cover member 10. With this difficulty in view, the second embodiment is aimed at the provision of a surface-mount type ceramic capacitor incorporating structural features which enable easy filling-up of the space between the lead terminals and the dielectric ceramic substrate.

Figure 4:
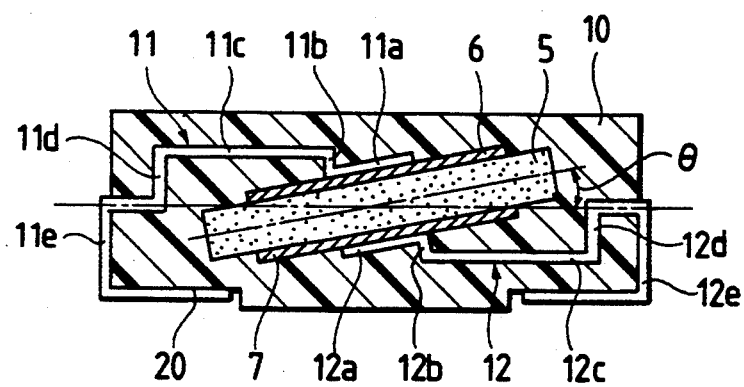
FIG. 4 is a cross-sectional view of a surface-mount type ceramic capacitor according to another embodiment of the present invention.

The ceramic capacitor according to the second embodiment includes, as shown in FIG. 4, a dielectric ceramic substrate 5, two electrodes 6, 7 and an insulating cover member 10. These parts 5, 6, 7 and 10 are substantially the same in construction as those of the ceramic capacitor of the first embodiment shown in FIG. 1.

The ceramic capacitor further includes two lead terminals 11 and 12 joined by a solder or a conductive adhesive with the electrodes 6, 7, respectively. The lead terminals 11, 12 are structurally different from the lead terminals 8, 9 in the first embodiment and, hence, a further description will be given of the structure of the lead terminals 11, 12. The lead terminal 11 includes a connecting portion 11a connected to the electrode 6 and inclined relative to an upper surface of the dielectric ceramic substrate 1, a step 11b bent up from an end of the connecting portion 11a, a horizontal portion 11c extending from a front end of the step (in the right-hand direction in FIG. 4) in parallel spaced relation to a mounting plane 20 of the ceramic capacitor and spaced from the dielectric ceramic substrate 5, a vertical portion 11d bent down from a front end of the horizontal portion 11c and spaced from the dielectric ceramic substrate 5, and a generally hook-shaped external terminal portion 11e extending from a front end of the vertical portion 11d. The mounting surface 20 is inclined at the same angle as the horizontal portion 11c with respect to a plane of the dielectric ceramic substrate 5. Similarly, the lead terminal 12 is composed of a connecting portion 12a connected to the electrode 7 and inclined relative to the lower surface of the dielectric ceramic substrate 5, a step 12b bent up from an end of the connecting portion 12a, a horizontal portion 12c extending from a front end of the step (in the left-hand direction in FIG. 4) in parallel spaced relation to a mounting plane 20 of the ceramic capacitor and spaced from the dielectric ceramic substrate 5, a vertical portion 12d bent down from a front end of the horizontal portion 12c and spaced from the dielectric ceramic substrate 5, and a generally hook-shaped external terminal portion 12e extending from a front end of the vertical portion 12d. The horizontal portions 11c and 12c and the mounting surface 20 are parallel to one another and inclined at the same angle relative to the plane of the dielectric ceramic substrate 5. The lead terminals 11, 12 are press-formed from an elongate strip made of a 42-alloy and having a thickness of 0.1 mm and a width of 2.5 mm.

As understood from the foregoing description, the surface-mount type ceramic capacitor shown in FIG. 4 differs from the surface-mount type ceramic capacitor shown in FIG. 1 in that the dielectric ceramic substrate 5 is disposed in an inclined posture within the insulating cover member 10. More specifically, in the second embodiment shown in FIG. 5, the dielectric substrate 5 held within the insulating cover member 10 is inclined at an angle $\theta$ (angle of inclination) relative to a mounting plane 20 of the ceramic capacitor. The mounting plane 20 is formed by a bottom surface of the cover member 10 used for mounting the ceramic capacitor on the surface of a printed circuit board (not shown). With this inclined posture of the dielectric ceramic substrate 5, it is possible to provide a larger space between the horizontal portions 11c, 12c and the dielectric ceramic substrate 5 than the space provided between the horizontal portions 8c, 9c and the dielectric ceramic substrate 5 of the ceramic capacitor shown in FIG. 1.

The angle $\theta$ of inclination of the dielectric ceramic substrate 5 is determined by an experiment performed in a manner described below.

100 samples were prepared for each of ceramic capacitors having dielectric ceramic substrates inclined at different angles $\theta$. Using those samples, a wet electric breakdown test was made. In the wet electric breakdown test, each sample was allowed to stand at a temperature of 85° C. and a relative humidity (R.H.) of 95% while continuously applying a DC voltage of 3 kV across the lead terminals of the sample. The test was stopped when an electric breakdown or short occurred in the sample. The occurrence of the electric breakdown is detected in terms of a current of 50 mA flowing across the lead terminals. The period of time passed before the electric breakdown (lifetime) and the number of samples succeeded in withstanding the wet electric breakdown test (survival rate) were recorded. The same test was made using 100 samples of the ceramic capacitor having a non-inclined or horizontal dielectric ceramic substrate ($\theta=0$) such as shown in FIG. 1. Results of the wet electric breakdown test are shown in Table 3.

TABLE 3

| Angle $\Theta$ of Inclination | Lifetime [Hr] and Survival Rate [%] | | | | |
|---|---|---|---|---|---|
| | 100 Hr | 200 Hr | 500 Hr | 1000 Hr | 2000 Hr |
| [Inventive Example] | | | | | |
| 5° | 100% | 100% | 99% | 95% | 85% |
| 10° | 100 | 100 | 100 | 100 | 90 |
| 15° | 100 | 100 | 100 | 100 | 92 |
| 20° | 100 | 100 | 100 | 100 | 92 |
| 25° | 100 | 100 | 100 | 100 | 93 |
| 30° | 100 | 100 | 100 | 100 | 92 |
| 35° | 100 | 100 | 100 | 100 | 93 |
| 40° | 100 | 100 | 100 | 100 | 92 |
| 45° | 100 | 100 | 100 | 100 | 92 |
| [Comparative Example] | | | | | |
| 0° | 100% | 100% | 98% | 92% | 78% |

As is apparent from Table 3, the ceramic capacitors having inclined dielectric ceramic substrates (Inventive Example) have a higher survival rate than the ceramic capacitor having a horizontal or non-inclined dielectric ceramic substrate (Comparative Example). Though not fully shown in Table 3, the rest of the results indicated that a higher survival rate was obtained by the angle $\theta$ of inclination in the range of from 1 to 45 degrees. Among others, an angle $\theta$ of inclination in the range of from 5 to 20 degrees is particularly preferable. The smaller the angle $\theta$ of inclination, the greater the difficulty in filling up the space between the lead terminals 11, 12 and the dielectric ceramic substrate 5. Conversely, an angle $\theta$ of inclination exceeding 20 degrees will increase the overall thickness of the ceramic capacitor.

As described above, the dielectric ceramic substrate 5 disposed in an inclined posture relative to the mounting plane 20 of the ceramic capacitor provides an enlarged spacing between the lead terminals 11, 12 and the dielectric ceramic substrate 5. With the large spacing thus provided, the material (insulating resin) of the cover member 10 is able to smoothly flow into the space between the lead terminals 11, 12 and the dielectric ceramic substrate 5, thereby fully filling up the space.

In the first and second embodiments described above, the lead terminals 8, 9; 11, 12 and the dielectric ceramic substrate 5 are separated by the material (insulating resin) of the cover member 10. It is possible, according to the invention, to replace the material of the insulating cover member 10 by a different insulating member which is preferably made of a moisture resistant insulating material.

The surface-mount type ceramic capacitors according to the present invention are compact in size (as having a length not greater than 9 mm, a width not greater than 8 mm and a height not greater than 4 mm) and have a higher electric breakdown strength so that they are particularly suitable for use in an intermediate to high tension circuit.

Obviously, various minor changes and modifications of the present invention are possible in the light of above teaching. It is therefore to be understood that within the scope of the appended claims the invention may be practiced otherwise than as specifically described.

What is claimed is:

1. A surface-mount type ceramic capacitor comprising:
   a dielectric ceramic substrate having a first surface and a second surface opposite to the first surface;
   a first electrode disposed on the first surface of the dielectric ceramic substrate;
   a second electrode disposed on the second surface of the dielectric ceramic substrate;
   a first lead terminal for leading a positive charge to the first electrode, the first lead terminal comprising a first connecting portion connected to a central portion of the first electrode, a first projecting portion which is connected to the first connecting portion and projects from the dielectric ceramic substrate at almost right angles to the dielectric ceramic substrate, and a first extending portion which is connected to the first projecting portion and is inclined at a fixed angle to the first surface of the dielectric ceramic substrate for gradual displacement from the dielectric ceramic substrate;
   a second lead terminal for leading a negative charge to the second electrode, the second lead terminal comprising a second connecting portion connected to a central portion of the second electrode to face the first connecting portion with the dielectric ceramic substrate between the first and second connecting portions, a second projecting portion which is connected to the second connecting portion and projects from the dielectric ceramic substrate at almost right angles to the dielectric ceramic substrate, and a second extending portion which is connected to the second projecting portion and is inclined at the fixed angle to the second surface of the dielectric ceramic substrate for gradual displacement from the dielectric ceramic substrate and extends in parallel to the first extending portion of the first lead terminal:
   a first insulating member filling a first space bounded by the dielectric ceramic substrate and the first lead terminal;
   a second insulating member filling a second space bounded by the dielectric ceramic substrate and the second lead terminal; and
   a cover member formed in a rectangular box shape for covering the dielectric ceramic substrate, the covering member having a mounting surface used to mount the surface-mount type ceramic capacitor on a printed circuit board, the mounting surface of the covering member being parallel to the first and second extending portions of the first and second lead terminals to minimize a height of the covering member.

2. A surface-mount type capacitor according to claim 1, wherein the first and second insulating members are respectively made of the same insulating material as the covering member.

3. A surface-mount type capacitor according to claim 1, wherein the fixed angle at which the first and second extending portions are inclined to the first and second surfaces of the dielectric ceramic substrate ranges from 1 to 45 degrees.

4. A surface-mount type capacitor according to claim 1, wherein the fixed angle at which the first and second extending portions are inclined to the first and second surfaces of the dielectric substrate ranges from 5 to 20 degrees.

5. A surface-mount type capacitor according to claim 1, wherein the cover member is molded from an epoxy resin.

6. A surface-mount type capacitor according to claim 1, wherein the first lead terminal is joined to the first electrode by solder, and the second lead terminal is joined to the second electrode by solder.

7. A surface-mount type capacitor according to claim 1, wherein the first lead terminal is joined to the first electrode by conductive adhesive, and the second lead terminal is joined to the second electrode by conductive adhesive.

8. A surface-mount type capacitor according to claim 1, wherein the fixed angle at which the first and second extending portions are inclined to the first and second surfaces of the dielectric substrate ranges from 1 to 20 degrees.

9. A surface-mount type capacitor according to claim 1, wherein the first projecting portion of the first lead terminal linearly extends at right angles to the first surface of the dielectric substrate, the second projecting portion of the second lead terminal linearly extends at right angles to the second surface of the dielectric substrate, the first extending portion of the first lead terminal linearly extends in parallel to the first surface of the dielectric ceramic substrate, and the second extending portion of the second lead terminal linearly extends in parallel to the second surface of the dielectric substrate.

10. A surface-mount type capacitor according to claim 1, wherein the cover member is formed in a rectangular box shape and has a length not greater than 9 mm, a width not greater than 8 mm and a height not greater than 4 mm.

11. A surface-mount type ceramic capacitor comprising:
    a plate-shaped dielectric substrate having a first surface and a second surface opposite to the first surface;
    a first electrode disposed on the first surface of the dielectric substrate;
    a second electrode disposed on the second surface of the dielectric substrate;
    a first lead terminal connected to the first electrode, the first lead terminal comprising a first connecting portion connected to the first electrode, a first projecting portion which is connected to the first connecting portion and projects from the dielectric substrate, and a first extending portion which is connected to the first projecting portion and is outwardly extended from the first projecting portion to be spaced from the dielectric substrate;
    a second lead terminal connected to the second electrode, the second lead terminal comprising a second connecting portion connected to the second electrode to face the first connecting portion with the dielectric substrate between the first and second connecting portions, a second projecting portion which is connected to the second connecting portion and projects from the dielectric substrate, and a second extending portion which is connected to the second projecting portion and is outwardly extended from the second projecting portion to be spaced from the dielectric substrate; and
    a covering member for covering the dielectric substrate, the first lead terminal and the second lead terminal to fill both a first space bounded by the dielectric substrate and the first extending portion of the first lead terminal and a second space bounded by the dielectric substrate and the second extending portion of the second lead terminal, the covering member having a length of 9 mm or less, a width of 8 mm or less and a height of 4 mm or less, an end of the first extending portion of the first lead terminal being projected from the covering member, and an end of the second extending portion of the second lead terminal being projected from the covering member;

wherein the plate-shaped dielectric substrate is disposed in an inclined posture at a fixed angle in the covering member, the first extending portion of the first lead terminal is extended at the fixed angle to the first surface of the dielectric substrate to gradually enlarge a first distance between the dielectric substrate and the first extending portion, and the second extending portion of the second lead terminal is extended at the fixed angle to the second surface of the dielectric substrate to gradually enlarge a first distance between the dielectric substrate and the first extending portion.

12. A surface-mount type capacitor according to claim 11, wherein the fixed angle at which the first and second extending portions are inclined to the first and second surfaces of the dielectric substrate ranges from 1 to 45 degrees.

13. A surface-mount type capacitor according to claim 11, wherein the fixed angle at which the first and second extending portions are inclined to the first and second surfaces of the dielectric substrate ranges from 1 to 20 degrees.

14. A surface-mount type capacitor according to claim 11, wherein the fixed angle at which the first and second extending portions are inclined to the first and second surfaces of the dielectric ceramic substrate ranges from 5 to 20 degrees.

15. A surface-mount type capacitor comprising:
a plate-shaped dielectric substrate having a first surface and a second surface opposite to the first surface;
a first electrode disposed on the first surface of the dielectric substrate;
a second electrode disposed on the second surface of the dielectric substrate;
a first lead terminal connected to the first electrode, the first lead terminal comprising a first connecting portion connected to the first electrode, and a first extending portion which is connected to the first connecting portion and is extended in an external direction to be spaced from the dielectric substrate, the first extending portion being inclined at a fixed angle to the first surface of the dielectric substrate to gradually enlarge a first space between the dielectric substrate and the first extending portion;
a second lead terminal connected to the second electrode, the second lead terminal comprising a second connecting portion connected to the second electrode to face the first connecting portion with the dielectric substrate between the first and second connecting portions, a second extending portion which is connected to the second connecting portion and is extended in an external direction to be spaced from the dielectric substrate, the second extending portion being inclined at the fixed angle to the second surface of the dielectric substrate to gradually enlarge a second space between the dielectric substrate and the first extending portion; and
a covering member for covering the dielectric substrate, the first lead terminal and the second lead terminal to fill both the first space bounded by the dielectric substrate and the first extending portion of the first lead terminal and the second space bounded by the dielectric substrate and the second extending portion of the second lead terminal, the plate-shaped dielectric substrate being disposed in an inclined posture at the fixed angle in the covering member, an end of the first extending portion of the first lead terminal being projected from the covering member, and an end of the second extending portion of the second lead terminal being projected from the covering member.

16. A surface-mount type capacitor according to claim 15, wherein the fixed angle at which the first and second extending portions are reclined to the first and second surfaces of the dielectric substrate ranges from 1 to 45 degrees.

17. A surface-mount type capacitor according to claim 15, wherein the fixed angle at which the first and second extending portions are inclined to the first and second surfaces of the dielectric substrate ranges from 1 to 20 degrees.

18. A surface-mount type capacitor according to claim 15, wherein the fixed angle at which the first and second extending portions are inclined to the first and second surfaces of the dielectric substrate ranges from 5 to 20 degrees.

* * * * *